United States Patent
Seyedsayamdost et al.

(10) Patent No.: US 12,436,145 B2
(45) Date of Patent: Oct. 7, 2025

(54) CRYPTIC ANTIBIOTICS AND METHODS FOR DETECTING BIOACTIVE CRYPTIC METABOLITES

(71) Applicant: THE TRUSTEES OF PRINCETON UNIVERSITY, Princeton, NJ (US)

(72) Inventors: Mohammad R. Seyedsayamdost, Princeton, NJ (US); Kyuho Moon, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 17/100,005

(22) Filed: Nov. 20, 2020

(65) Prior Publication Data
US 2021/0156840 A1    May 27, 2021

Related U.S. Application Data

(60) Provisional application No. 62/938,531, filed on Nov. 21, 2019.

(51) Int. Cl.
G01N 33/483    (2006.01)
C12N 1/20    (2006.01)

(52) U.S. Cl.
CPC ........... *G01N 33/4833* (2013.01); *C12N 1/20* (2013.01)

(58) Field of Classification Search
CPC ...... G01N 33/4833; C12N 1/20; Y02A 50/30; A61K 31/53; C07K 14/195; C12P 17/182
See application file for complete search history.

(56) References Cited

PUBLICATIONS

Miller et al (1963), Isolation and Characterization of Antibiotic MSD-92, A Pyrimidotriazine antibiotic. Antimicrobial Agents and Chemotherapy, 161, 58-62 (Year: 1963).*
Taylor, E. C., & Sowinski, F. (1975). Synthesis of the pyrimido [5, 4-e]-as-triazine antibiotics fervenulin and 2-methylfervenulone. The Journal of Organic Chemistry, 40(16), 2321-2329. (Year: 1975).*
Moon, K., Xu, F., Zhang, C., & Seyedsayamdost, M. R. (2019). Bioactivity-HiTES unveils cryptic antibiotics encoded in actinomycete bacteria. ACS chemical biology, 14(4), 767-774. (Year: 2019).*
Genilloud, O. (2019). Natural products discovery and potential for new antibiotics. Current opinion in microbiology, 51, 81-87. (Year: 2019).*
"Moon 2019a": Moon, K., Xu, F., Zhang, C., & Seyedsayamdost, M. R. (2019). Bioactivity-HiTES unveils cryptic antibiotics encoded in actinomycete bacteria. ACS chemical biology, 14(4), 767-774. Additional supplemental information included (Year: 2019).*
"Moon 2019b": Moon, K., Xu, F., & Seyedsayamdost, M. R. (2019). Cebulantin, a cryptic lanthipeptide antibiotic uncovered using bioactivity-coupled HiTES. Angewandte Chemie International Edition, 58(18), 5973-5977. (Year: 2019).*
Ansel, H. C., Norred, W. P., & Roth, I. L. (1969). Antimicrobial activity of dimethyl sulfoxide against *Escherichia coli, Pseudomonas aeruginosa*, and *Bacillus megaterium*. Journal of pharmaceutical sciences, 58(7), 836-839. (Year: 1969).*
Bakalar, N. (2016). Earth may be home to a trillion species of microbes. New York Times. (Year: 2016).*
Rogers, Kara. "Gram-negative bacterium". Encyclopedia Britannica, Jun. 4, 2024, https://www.britannica.com/science/Gram-negative-bacterium. Accessed Jun. 26, 2024. (Year: 2024).*
Breijyeh, Z., Jubeh, B., & Karaman, R. (2020). Resistance of gram-negative bacteria to current antibacterial agents and approaches to resolve it. Molecules, 25(6), 1340. (Year: 2020).*
Ayala, A.J., Ogbunugafor, C.B. (2023). When Vibrios Take Flight: A Meta-Analysis of Pathogenic *Vibrio* Species in Wild and Domestic Birds. In: Almagro-Moreno, S., Pukatzki, S. (eds) *Vibrio* spp. Infections. (Year: 2023). Advances in Experimental Medicine and Biology, vol. 1404. Springer, Cham. https://doi.org/10.1007/978-3-031-22997-8_15 (Year: 2023).*
Gxalo O, Digban TO, Igere BE, Olapade OA, Okoh AI, Nwodo UU. Virulence and Antibiotic Resistance Characteristics of Vibrio Isolates From Rustic Environmental Freshwaters. Front Cell Infect Microbiol. Aug. 19, 2021;11:732001. doi: 10.3389/fcimb.2021. 732001. PMID: 34490150; PMCID: PMC8416912. (Year: 2021).*

(Continued)

*Primary Examiner* — Melenie L Gordon
*Assistant Examiner* — Kimberly C. Breen
(74) *Attorney, Agent, or Firm* — Meagher Emanuel Laks Goldberg & Liao, LLP

(57) ABSTRACT

Bacteria harbor an immense reservoir of potentially new and therapeutic small molecules in the form of "silent" biosynthetic gene clusters. These clusters can be identified bioinformatically but are at best sparingly expressed under normal laboratory growth conditions; their products are therefore not interrogated during bioactivity screening exercises. An estimated 80-90% of biosynthetic loci are silent, meaning that routine bioactivity screens miss the majority of microbial biosynthetic potential. Disclosed herein is a method that allows access to this vast hidden metabolome, thereby allowing researchers to screen the complete metabolomes of microorganisms in the search of new therapeutic leads. The disclosed approach, "Bioactivity-HiTES", broadly activates the secondary metabolomes of bacteria and links the cryptic metabolites produced to a desired biological activity. Using the disclosed method, induction of cryptic antibiotics was detected in all four actinomycete bacterial strains that were tested as proof-of-concept. Follow-up in two cases demonstrated the production of two new antibiotics: In one case, the taylorflavins, pyrimidine antibiotics that harbor selective growth-inhibitory activity toward Gram-negative bacteria, were identified. For example, taylorflavin B shows potent minimal inhibitory concentration toward *Neisseria gonorrhoeae* and *Acinetobacter baumanii*, but not against a panel of Gram-positive bacteria. In the second case, the lanthipeptide cebulantin, which is specific toward Gram-negative *Vibrio* pathogens, but does not affect the growth of Gram-positive bacteria tested, was identified. These compounds, taylorflavins and cebulantin, may serve as useful leads in the future. At the same time, Bioactivity-HiTES may be applied broadly to identify cryptic metabolites with the desired biological properties.

11 Claims, 7 Drawing Sheets

(56) References Cited

PUBLICATIONS

Clardy et al., "New antibiotics from bacterial natural products", Nature Biotechnology, vol. 24, No. 12, pp. 1541-1550. Dec. 2006.
Earl et al., "Discovery of human cell selective effector molecules using single cell multiplexed activity metabolomics", Nature Communications, vol. 9, No. 39, 2018.
Okada et al., "Antibiotic dialogues: induction of silent biosynthetic gene clusters by exogenous small molecules", FEMS Microbiology Review, vol. 41, pp. 19-33, 2017.
Zarins-Tutt et al., "Prospecting for New Bacterial Metabolites: A Glossary of Approaches for Inducing, Activating and Upregulating the Biosynthesis of Bacterial Cryptic or Silent Natural Products", Nat. Prod. Rep. Vol. 33, pp. 54-72, 2016.
Seyedsayamdost et al., "High-throughput platform for the discovery of elicitors of silent bacterial gene clusters", Proc. Natl. Acad. Sci. USA, vol. 111, No. 20, pp. 7266-7271, 2014.
Okasa et al., "Mapping the Trimethoprim-Induced Secondary Metabolome of Burkholderia thailandensis", ACS Chem. Biol., vol. 11, No. 8, pp. 2124-2130, Aug. 19, 2016.
Xu et al., "Discovery of a Cryptic Antifungal Compound from *Streptomyces albus* J1074 Using High-Throughput Elicitor Screens", J. Am. Chem. Soc., vol. 139, No. 27, pp. 9203-9212, Jul. 12, 2017.
Moon et al., "Bioactivity-HiTES Unveils Cryptic Antibiotics Encoded in Actinomycete Bacteria", ACS Chem. Biol. 2019, vol. 14, No. 4, pp. 767-774, DOI: 10.1021/acschembio.9b00049, Apr. 19, 2019.
Pimentel-Elardo et al., "*Saccharopolyspora cebuensis* sp. nov., a novel actinomycete isolated from a Philippine sponge (*Porifera*)", Int. J. Syst. Evol. Microbiolgy, vol. 58, pp. 628-632, 2008.
Xie et al., "Saccharopolytide A, a new cyclic tetrapeptide with rare 4-hydroxy-proline moieties from the deep-sea derived actinomycete *Saccharopolyspora cebuensis* MCCC 1A09850", Nat. Prod. Res., vol. 32, pp. 1627-1631, 2018.
Ruiz et al., "Chemical conditionality: a genetic strategy to probe organelle assembly", Cell 2005, vol. 121, pp. 307-317, Apr. 22, 2005.
Repka et al., "Mechanistic Understanding of Lanthipeptide Biosynthetic Enzymes", Chemical Reviews, vol. 117, pp. 5457-5520, 2017.
Knerr et al., "Discovery, Biosynthesis, and Engineering of Lantipeptides", Annu. Rev. Biochem., vol. 81, pp. 479-505, 2012.
Willey et al., "Lantibiotics: Peptides of Diverse Structure and Function", Annu. Rev. Microbiol., vol. 61, pp. 477-501, 2007.
Hudson et al., "RiPP Antibiotics: Biosynthesis and Engineering Potential", Curr. Opin. Microbiol., vol. 45, pp. 61-69, Oct. 2018.
Mederma et al., "antiSMASH: rapid identification, annotation and analysis of secondary metabolite biosynthesis gene clusters in bacterial and fungal genome sequences", Nucleic Acids Res., vol. 39, W339-W346, Jun. 14, 2011.
Boakes et al., "Organization of the genes encoding the biosynthesis of actagardine and engineering of a variant generation system", Molecular Microbiolgy, vol. 72, No. 5, pp. 1126-1136, 2009.
Shi et al., "Heterologous production of the lantibiotic Ala(0)actagardine in *Escherichia coli*", ChemCommun, vol. 48, pp. 10966-10968, 2012.
Maier et al., "Functional characterization of different ORFs including luciferase-like monooxygenase genes from the mensacarcin gene cluster", ChemBioChem, vol. 16, pp. 1175-1182, 2015.
Hetrick et al., "Development and Application of Yeast and Phage Display of Diverse Lanthipeptides", ACS Cent. Sci., vol. 4, pp. 458-467, 2018.
Hetrick et al., "Ribosomally synthesized and post-translationally modified peptide natural product discovery in the genomic era", Curr. Opin. Chem. Biol., vol. 38, pp. 36-44, Jun. 2017.
Gibson et al., "Small Biomolecules for Big Applications", ACS Cent. Sci., vol. 4, pp. 437-439, 2018.
Craney et al., "Chemical Perturbation of Secondary Metabolism Demonstrates Important Links to Primary Metabolism", Chemistry & Biology, vol. 19, pp. 1020-1027, Aug. 24, 2012.
Pimentel-Elardo et al., "Activity-Independent Discovery of Secondary Metabolites Using Chemical Elicitation and Cheminformatic Inference", ACS Chem. Biol., vol. 10, pp. 2616-2623, 2015.
Xu et al., "A Genetics-Free Method for High-Throughput Discovery of Cryptic Microbial Metabolites", Nat. Chem. Biol., vol. 15, No. 2, pp. 161-168, Feb. 2019.

\* cited by examiner

Taylorflavin A (7)

2-Methyl-fervenulone (8) (Taylorflavin B)

Pyridindolol (9)

6,7,8-Trimethoxy-3-methylisocoumarin (10)

6,8-Dihydroxy-3-methylisocoumarin (11)

Hirochidine (12)

Cinimycin A (13)

CRYPTIC ANTIBIOTICS AND METHODS FOR DETECTING BIOACTIVE CRYPTIC METABOLITES

CROSS-REFERENCE TO RELATED APPLICATIONS

This application claims priority to U.S. Provisional Patent Application No. 62/938,531, filed Nov. 21, 2019, which is herein incorporated by reference in its entirety.

STATEMENT REGARDING FEDERALLY SPONSORED RESEARCH OR DEVELOPMENT

This invention was made with government support under Grant #AI124786 awarded by the National Institutes of Health. The government has certain rights in the invention.

BACKGROUND

Bacteria produce a diverse array of secondary metabolites, or natural products, the discovery of which has been an important driving force for various disciplines in chemistry, biology, and pharmacology. Natural products account for more than 50% of the drugs approved by the FDA in the United States in the past ~35 years and >70% of the current clinical antibiotics. These data provide a strong impetus for the continued discovery and development of new natural products.

By the early 2000s, the secondary metabolic potential of well-known bacterial genera appeared to have been exhausted. Rediscovery of old molecules was a major bottleneck, leading to a sharp decline in natural product research in the pharmaceutical industry. However, innovations that led to next generation sequencing and the ensuing accumulation of thousands of complete bacterial genomes, along with advances in bioinformatic identification of biosynthetic genes, revealed that the biosynthetic potential of bacteria, even well-studied ones, had been vastly underestimated. Skilled artisans now know that bacteria harbor many secondary metabolite biosynthetic gene clusters (BGCs) that do not give rise to detectable or appreciable levels of a small molecule product under normal growth conditions. These BGCs are referred to as 'silent' or 'cryptic' and the current consensus is that they outnumber constitutively active ones by a factor of 5-10. Silent BGCs, therefore, represent a massive reservoir of potentially new small molecules, the underlying chemistry and biology of which remain to be explored.

With the realization of the abundance of silent BGCs, feverish activity has followed to devise methods for harvesting cryptic metabolites. Previous methodologies place a reporter gene inside the gene cluster of interest and small molecule libraries are then screened against the reporter strain to find suitable transcriptional elicitors or inducers. With the inducer identified, the small molecule product can be characterized along with the regulation of the silent BGC, an area that remains largely in its infancy. The disadvantage of these approaches is that genetic manipulations and/or molecular biology approaches are required. These slow down the pace of discovery, especially in the talented but genetically-intractable rare actinomycetes, which are prolific producers of secondary metabolites and harbor stores of silent BGCs. A second drawback of most available approaches is that they do not link bioactivity to a given cryptic metabolite or BGC. Therefore, activity assays must be conducted upon discovery of a cryptic metabolite. Given that natural products have a virtually unlimited potential for biological function, both in the environment and in medicine, a method that directly connects bioactivity to a cryptic metabolite prior to its tedious isolation and structural elucidation would be highly beneficial.

As the bioactive gene clusters may be manipulated into producing cryptic metabolites that have useful properties, such as antimicrobial or antibiotic properties, such materials and techniques for producing such materials are also useful and desirable.

BRIEF SUMMARY

Disclosed is a technique that broadly activates the secondary metabolomes of bacteria and links the cryptic metabolites produced to a desired biological activity. The disclosed approach addresses both limitations mentioned above and obviates the need for genetic manipulations by identifying cryptic metabolites with the desired bioactivity: a wild-type microorganism is subjected to elicitor screening in a high-throughput fashion. The resulting 'induced metabolomes' are screened for a chosen bioactivity. Activity-guided fractionation in combination with the elicitor then allow for isolation and characterization of the cryptic metabolite.

The method for producing cryptic, bioactive metabolites involves four basic steps.

First, a plurality of cells are grown in wells, where each well contains one or more cells and one or more elicitors (such as from a small molecule library). The cells exhibit no first level of activity against a target cell under standard laboratory growth conditions. The producing cell may be any microbial strain or mixture of strains. The target cell may optionally be, e.g., a Gram-positive or Gram-negative bacterium, *E. coli*, a fungal strain such as *Saccharomyces cerevisiae* or *Candida albicans*, a cancer cell, or a virus. The activity may optionally be, e.g., antimicrobial activity, antifungal activity, antiviral activity, anticancer activity, or any combination thereof. For example, a skilled artisan will recognize that the actinomycete *Saccharopolyspora cebuensis* does not produce any antibiotics against *E. coli* under normal growth conditions.

After growth, the cells are separated, and the supernatant from each well is then screened to determine a second activity against the target cell. In the above example, the supernatant from *S. cebuensis* grown with an elicitor would be screened for antibiotic activity against *E. coli*.

If the second activity is greater than the first activity (and preferably if the second activity is the highest second activity of all wells being tested), a skilled artisan may identify the elicitor that was used to generate the supernatant that resulted in that higher activity.

Then, at least one molecule responsible for the higher second activity is identified. For example, the supernatant for a cell grown in the presence of a given elicitor can be purified and molecules in the supernatant can be identified. Those results can be compared to supernatant for the cell under normal growth conditions, and one or more cryptic metabolites that were only present when the cell was grown in the presence of the given elicitor(s) can be identified.

Also disclosed is a method for inhibiting the growth of a Gram-negative pathogen. The method comprises providing an antimicrobial agent to a location containing a Gram-negative pathogen, the antimicrobial agent comprising taylorflavin A, taylorflavin B, or cebulantin, or a derivative thereof, and then allowing the antimicrobial agent to come into contact with the gram-negative pathogen.

Also disclosed is an antimicrobial composition, comprising an antimicrobial agent, which can be taylorflavin A, taylorflavin B, or cebulantin, or a derivative thereof, and a pharmaceutically acceptable carrier.

Also disclosed is a method for producing cryptic, bioactive metabolites. The method involves eliciting the production of a bioactive metabolite by growing a cell in the presence of an elicitor. The cell may be, e.g., S. cebuensis or S. hiroshimensis. The elicitor may be, e.g., furosemide or atenolol. The method then involves generating supernatant containing the bioactive metabolite, and then purifying the bioactive metabolite.

DETAILED DESCRIPTION

Figure 1:
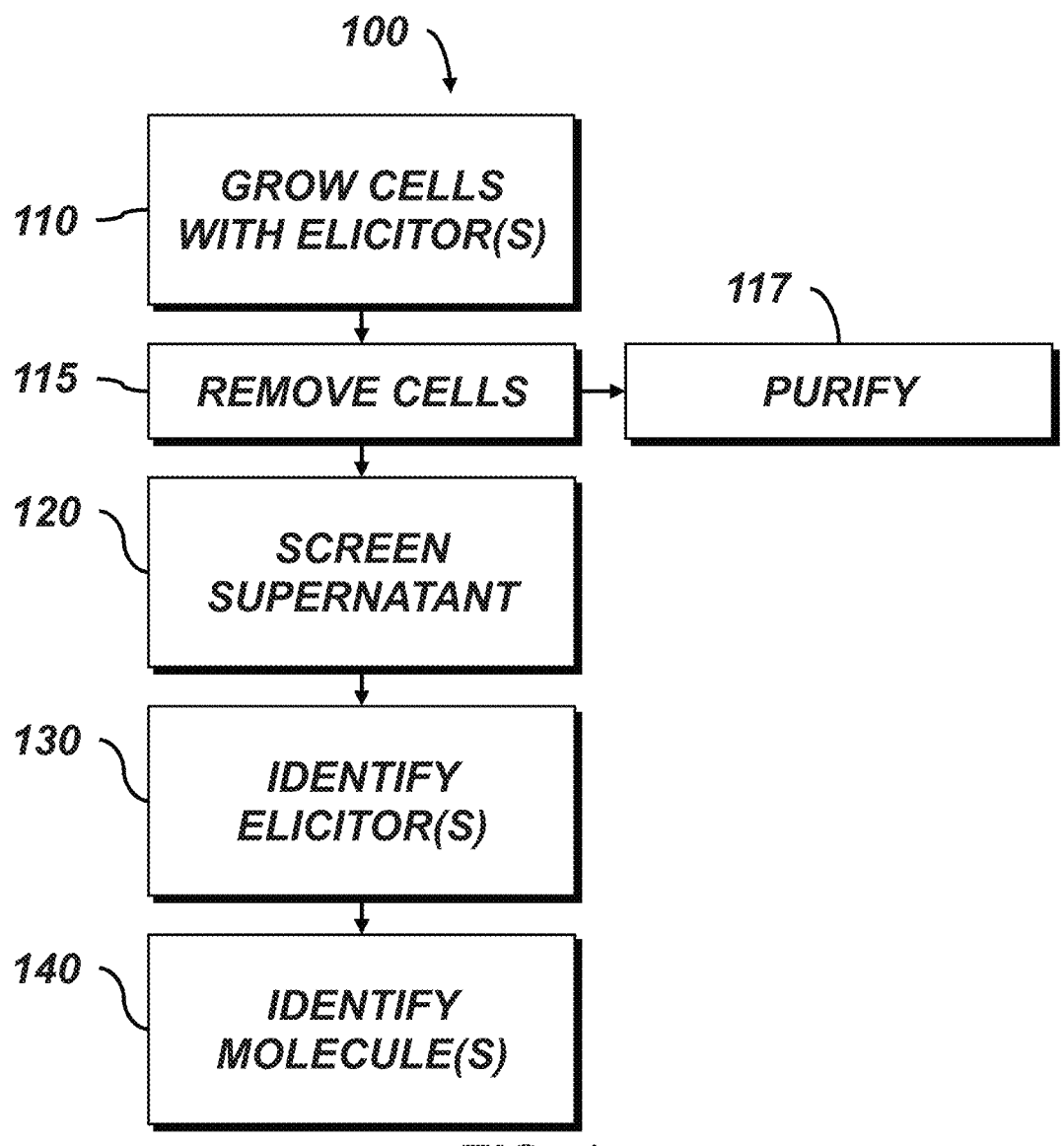
FIG. 1 is a flowchart describing an embodiment of the disclosed method.

As used herein, articles such as "a" and "an" when used in a claim, are understood to mean one or more of what is claimed or described.

As used herein, the term "about [a number]" is intended to include values rounded to the appropriate significant digit. Thus, "about 1" would be intended to include values between 0.5 and 1.5, whereas "about 1.0" would be intended to include values between 0.95 and 1.05.

As used herein, "administering" is meant a method of giving a dosage of a pharmaceutical composition (e.g., a composition of the invention, such as any one of the vaccines of the first or fourth aspects, the compositions of the third aspect, the nucleic acid molecules of the fifth aspect, and/or the vectors of the sixth aspect) to a subject. The compositions utilized in the methods described herein can be administered, for example, intramuscularly, intravenously, intradermally, percutaneously, intraarterially, intraperitoneally, intralesionally, intracranially, intraarticularly, intraprostatically, intrapleurally, intratracheally, intranasally, intravitreally, intravaginally, intrarectally, topically, intratumorally, peritoneally, subcutaneously, subconjunctivally, intravesicularlly, mucosally, intrapericardially, intraumbilically, intraocularly, orally, topically, locally, by inhalation, by injection, by infusion, by continuous infusion, by localized perfusion bathing target cells directly, by catheter, by lavage, by gavage, in cremes, or in lipid compositions. The preferred method of administration can vary depending on various factors (e.g., the components of the composition being administered and the severity of the condition being treated).

As used herein, the term "at least one" means one or more and thus includes individual components as well as mixtures/combinations.

As used herein, "cell" refers to a prokaryotic or a eukaryotic cell. Suitable cells can be, for example, of mammalian, avian, insect, bacterial, yeast or plant origin. Non-limiting examples of mammalian cells include human, bovine, ovine, porcine, murine, and rabbit cells. In another embodiment, the cell can be an embryonic cell, bone marrow stem cell, or other progenitor cell. In another embodiment, the cell is a somatic cell, which can be, for example, an epithelial cell, fibroblast, smooth muscle cell, blood cell (including a hematopoietic cell, red blood cell, T-cell, B-cell, etc.), tumor cell, cardiac muscle cell, macrophage, dendritic cell, neuronal cell (e.g., a glial cell or astrocyte), or pathogen-infected cell (e.g., those infected by bacteria, viruses, virusoids, parasites, or prions). In some embodiments, the cell may also refer to a single-celled organism (eubacteria, bacteria, yeast, protozoa), or multi-celled organisms (fungi, algae, mold). The cells are preferably wild-type cells.

As used herein, a "cryptic metabolite" refers to a small molecule metabolite that is not produced at a detectable level (or not produced at an appreciable level, such as not in an amount sufficient to produce a detectable degree of activity, such as antibiotic activity, etc.) and preferably not produced at all during standard laboratory growth conditions.

As used herein, "elicitor" refers to any compound with the potential to cause a cell to generate a cryptic metabolite. Elicitors may be, e.g., compounds in a small molecule library.

As used herein, the terms "include", "includes" and "including" are meant to be non-limiting.

Disclosed herein is a process to discover cryptic, bioactive metabolites from any culturable microorganism using a combination of small molecule elicitation and bioactivity assays. The organism of choice is challenged with a library of small molecules. The metabolomes that result, in response to each molecule from the library, are then screened for the desired biological activity. In this work, antibiotic activity against Gram-negative bacteria was utilized, but any desirable bioassay may be used. The disclosed approach, termed "Bioactivity-HiTES", broadly activates the secondary metabolomes of bacteria and links the cryptic metabolites produced to a desired biological activity.

The utility of the disclosed approach lies, inter alia, in finding bioactive molecules that would be missed in routine bioactivity screens. That is, the disclosed approach allows one to look for bioactive molecules that are not produced by bacteria under standard culturing conditions. The utility of this approach was demonstrated by applying it to several actinomycete bacteria.

Currently and traditionally, antibiotic activity screens have focused on growing bacteria under standard conditions and conducting screens of biological activity against select targets. It is now known that this process only captures ~10-20% of natural products that a given bacterium can synthesize. That is, these traditional assays are "blind" to cryptic metabolites that bacteria can produce. The disclosed technique demonstrates that cryptic metabolomes can be screened for desired bioactivities. A major advantage of this approach is that genetic manipulations are not required, a feature that drastically increases the number of organisms that can be subjected to this process thereby expediting lead discovery. More broadly, the disclosed method can be used to find hidden or cryptic metabolites with the desired biological activity that are encoded in microbial genomes. Disclosed is a method for producing and identifying cryptic, bioactive metabolites. Referring to FIG. 1, the method (100) involves several steps.

First, a plurality of cells are grown in a plurality of wells in the presence of one or more elicitors (110). The wells are typically a multi-well array, such as a 6-, 12-, 24-, 48-, 96-, 384-, or 1536-well array.

Each well contains one or more cells to be grown, which may sometimes be referred to herein as cryptic cells. These are cells, preferably unmodified cells, that are capable of producing a cryptic metabolite under the correct conditions.

Any one of a broad range of microbial cells is envisioned as being utilized. For example, in some preferred embodiments, the cells grown in each well comprise bacteria belonging to the actinomycete group, the myxobacteria group, or the genera of *Bukholderia* or *Pseudomonas*. In some embodiments, fungal cells are utilized.

In preferred embodiments, the cells grown in each well comprise such strains, including but not limited to, *S. bayanus, S. cerevisiae, S. cariocanus, S. hiroshimensis, S. kudriavzevii, S. lavendulae, S. mikatae, S. paradoxus,* and *S. pastorianus*. In some embodiments, non-recombinant *S. cerevisiae* is preferably used.

In other preferred embodiments, the cells grown in each well comprise wild-type or non-recombinant cells of *Saccharopolyspora*, including but not limited to *S. cavernae, S. cebuensis, S. erythraea, S. gregorii, S. halophilia, S. hordei, S. indica, S. rosea, S. spinosa, S. spongiae,* and *S. subtropica*.

In other preferred embodiments, the cells grown in each well comprise wild-type or non-recombinant cells of *Amycolatopsis*, including but not limited to, *A. alba, A. albidoflavus, A. azurea, A. eurthyerma, A. granulosa, A. japonica, A. keratimphila, A. orientalis, A. plumensis, A. rifamycinica, A. sacchari, A. thermoflava,* and *A. viridis*.

In other preferred embodiments, the cells in each well comprise wild-type or non-recombinant cells of *Candida*, including but not limited to, *C. albicans, C. tropicalis, C. dubliniensis, C. viswanathii,* and *C. parapsilosis*.

The cells grown in each well will have no first level of activity against one or more target cells under normal growth conditions. Normal growth conditions are those non-stress, substantially optimal growth conditions, without the presence of the elicitor(s), which would be known to the skill artisan as appropriate for the cell being grown.

The activity may optionally be, e.g., antibiotic activity, antimicrobial activity, antifungal activity, antiviral activity, anticancer activity, or any combination thereof, as appropriate for the target cell(s). For example, a skilled artisan will recognize that the actinomycete *S. cebuensis* does not produce any antibiotics against *E. coli* under normal growth conditions. Said differently, for *S. cebuensis* as the cell to be grown, a skilled artisan would understand that cell as having an undesirable first activity (e.g., no antibiotic activity at all) against *E. coli* as a target cell under normal growth conditions.

The target cell may optionally be a Gram-positive bacterium (including *Enterococcus* species (such as *E. faecalis, E. faecium, E. hirae*), and *Staphylococcus* species (such as *S. aureus, S. epidermidis, S. auricularis, S. capitis, S. haemolyticus, S. hominis, S. saprophyticus, S. simulans,* and *S. xylosis*).

The target cell may optionally be a Gram-negative bacterium (including *Acinetobacter* species (such as *A. calcoaceticus, A. baumannii,* and *A. pittii*), *Escherichia* species (such as *E. coli, E. fergusonii,* and *E. vulneris*), *Shigella* species (such as *S. dysenteriae, S. flexneri, S. boydii,* and *S. sonnei*), *Klebsiella* species (such as *K. aerogenes,* and *K. pneumoniae*), *Pseudomonas* species (such as *P. aeruginosa, P. alcaligenes, P. anguilliseptica, P. argentinensis, P. borbori, P. citronellolis, P. flavescens, P. folliculitis, P. mendocina, P. nitroreducens, P. oleovorans, P. pseudoalcaligenes, P. resinovorans, P. straminea P. syringae*), *Salmonella* species (such as *S. bongori,* and *S. enterica*), or *Yersinia* species (such as *Y. enterocolitica, Y. pestis,* and *Y. pseudotuberculosis*).

The target cell may optionally be a fungal strain (which includes species of yeasts), such as a *Saccharomyces* species (such as *S. bayanus, S. cerevisiae,* and *S. paradoxus*) or a *Candida* species (such as *C. albicans,* and *C. auris*).

The target cell may optionally be a cancer cell (also referred to as a "cancerous cell," or a "tumor cell")—cells characterized by an unregulated cell growth, wherein the cancerous cells are capable of local invasion and/or metastasis to noncontiguous sites. These cancer cells encompass cells caused by all types of cancers, including, but not limited to, all forms of carcinomas, melanomas, sarcomas, lymphomas and leukemias, including without limitation, cancers of the cardiac system: sarcoma (angiosarcoma, fibrosarcoma, rhabdomyosarcoma, liposarcoma), myxoma, rhabdomyoma, fibroma, lipoma and teratoma; cancers of the lung: bronchogenic carcinoma (squamous cell, undifferentiated small cell, undifferentiated large cell, adenocarcinoma), alveolar (bronchiolar) carcinoma, bronchial adenoma, sarcoma, lymphoma, chondromatous hanlartoma, inesothelioma; cancers of the gastrointestinal system: esophagus (squamous cell carcinoma, adenocarcinoma, leiomyosarcoma, lymphoma), stomach (carcinoma, lymphoma, leiomyosarcoma), pancreas (ductal adenocarcinoma, insulinoma, glucagonoma, gastrinoma, carcinoid tumors, vipoma), small bowel (adenocarcinoma, lymphoma, carcinoid tumors, Karposi's sarcoma, leiomyoma, hemangioma, lipoma, neurofibroma, fibroma), large bowel (adenocarcinoma, tubular adenoma, villous adenoma, hamartoma, leiomyoma); cancers of the genitourinary tract: kidney (adenocarcinoma, Wilm's tumor [neplrroblastoma], lymphoma, leukemia), bladder and urethra (squamous cell carcinoma, transitional cell carcinoma, adenocarcinoma), prostate (adenocarcinoma, sarcoma), testis (seminoma, teratoma, embryonal carcinoma, teratocarcinoma, choriocarcinoma, sarcoma, interstitial cell carcinoma, fibroma, fibroadenoma, adenomatoid tumors, lipoma); cancers of the liver: hepatoma (hepatocellular carcinoma), cholangiocarcinoma, hepatoblastoma, angiosarcoma, hepatocellular adenoma, hemangioma; cancers of the bone: osteogenic sarcoma (osteosarcoma), fibrosarcoma, malignant fibrous histiocytoma, chondrosarcoma, Ewing's sarcoma, malignant lymphoma (reticulum cell sarcoma), multiple myeloma, malignant giant cell tumor chordoma, osteochronfroma (osteocartilaginous exostoses), benign chondroma, chondroblastoma, chondromyxofibroma, osteoid osteoma and giant cell tumors; cancers of the nervous system: skull (osteoma, hemangioma, granuloma, xanthoma, osteitis deformians), meninges (meningioma, meningiosarcoma, gliomatosis), brain (astrocytoma, medulloblastoma, glioma, ependymoma, germinoma [pinealoma], glioblastoma multiform, oligodendroglioma, schwannoma, retinoblastoma, congenital tumors), spinal cord neurofibroma, meningioma, glioma, sarcoma); gynecological cancers: uterus (endometrial carcinoma), cervix (cervical carcinoma, pre-tumor cervical dysplasia), ovaries (ovarian carcinoma [serous cystadenocarcinoma, mucinous cystadenocarcinoma, unclassified carcinoma], granulosa-thecal cell tumors, Sertoli Leydig cell tumors, dysgerminoma, malignant teratoma), vulva (squamous cell carcinoma, intraepithelial carcinoma, adenocarcinoma, fibrosarcoma, melanoma), vagina (clear cell carcinoma, squamous cell carcinoma, botryoid sarcoma (embryonal rhabdomyosarcoma), fallopian tubes (carcinoma); hematologic cancers: blood (myeloid leukemia [acute and chronic], acute lymphoblastic leukemia, chronic lymphocytic leukemia, myeloproliferative diseases, multiple myeloma, myelodysplastic syndrome), Hodgkin's disease, non-Hodgkin's lymphoma [malignant lymphoma], anaplastic large cell lymphoma (ALCL); skin cancers: malignant melanoma, basal cell carcinoma, squamous cell-carcinoma, Karposi's sarcoma, moles dysplastic nevi, lipoma, angioma, dermatofibroma, keloids, psoriasis; and cancers of the adrenal glands: neuroblastoma.

The target cell may optionally be a virus, an infectious agent that is unable to grow or reproduce outside a host cell, such as one that infects mammals (e.g., humans) or birds. In some embodiments, the capsid is naked. In some embodiments, the capsid is enveloped. In some embodiments, the virus is double stranded. In some embodiments, the virus is single stranded. In some embodiments, the capsid has icosahedral symmetry. In some embodiments, the capsid has complex symmetry. In some embodiments, the capsid has helical symmetry.

In some embodiments, the virus is a DNA virus, such as from the Adenoviridae family, the Papovaviridae family (such as HPV), the Parvoviridae family (such as Human parvovirus B19), the Herpesviridae family (such as the Herpes simplex virus), the Poxviridae family (such as the Smallpox virus, monkeypox virus, or cowpox virus), the Anelloviridae family, and the Pleolipoviridae family (such as HHPV11, HRPV1). In some embodiments, the virus is an RNA virus, such as from the Arenaviridae family (such as lumphocytic choromeningitis virus), the Arteriviridae family (such as arterivirus), the Astroviridae family (such as astraovirus), the Bornaviridae family (such as Borna disease virus), the Bunyaviridae family (such as California encephalitis virus), the Caliciviridae family (such as Norwalk virus), the Coronaviridae family (such as SARS-CoV-2, and MERS), the Filoviridae family (such as Ebola virus), the Flaviviridae family (such as Dengue virus, and hepatitis C virus), the Hepeviridae family (such as Hepatitis E virus), the Orthomyxoviridae family (such as influenzavirus A, B, and C), the Parmyxoviridae family (such as measles virus, and mumps virus), the Picornaviridae family (such as enterovirus, rhinovirus, and coxsackie), the Reoviridae family (such as reovirus or rotavirus), the Rhabdoviridae family (such as rabies virus), or the Togaviridae family (such as easter equine encephalitis). In some embodiments, the virus is a Reverse-transcribing virus, such as from the Retroviridae family (such as HIV), and the Hepadnaviridae family (such as the Hepatitis B virus).

Each well also contains one or more elicitors. Although the general form of the elicitor is not particularly limited, the elicitors are generally a solid or liquid material. The elicitors are preferably from a small molecule library, but the use of any compound or group of compounds is envisioned. In some embodiments, at least one elicitor is a known pharmaceutical agent.

In some embodiments, each well is exposed to a single elicitor. In some embodiments, some or all of the wells are exposed to two or more elicitors. In some embodiments, some or all of the wells are exposed to two elicitors. In some embodiments, some or all of the wells are exposed to three or more elicitors.

Referring again to FIG. 1, the next steps occur after the cells have been grown. The cells are first removed, for example by filtration or centrifugation. The supernatant from each well is then screened (120) to determine a second activity against the target cell.

It should be noted that as used herein, the terms "first" and "second" are used to distinguish the activity of supernatant against a target organism from a cell grown under standard laboratory conditions (the "first" activity), versus the activity of supernatant from cells grown under elicitor-induced conditions (the "second" activities). The type of activity being measured is the same. That is, when comparing "first" and "second" activities, a "first" antibiotic activity is compared against a "second" antibiotic activity, a "first" anti-cancer activity would be compared to a "second" anticancer activity, etc. For example, the "first" activity may be the antibiotic activity produced by *S. cebuensis* against *E. coli* under standard laboratory conditions (it is known that no antibiotic is produced), while the "second" activity would be a measure of the supernatant from *S. cebuensis* as an antibiotic against *E. coli* grown while exposed to some elicitor. Typically, the "first" activity and the "second" activity are measured via the same activity assay.

Using the previous *S. cebuensis/E. coli* example, the supernatant from *S. cebuensis* grown with an elicitor would be screened for antibiotic activity against *E. coli*, via, e.g., a disc diffusion assay or microtiter plate assays. Other assay formats may be used for different activities. This screening step is preferably done in a high-throughput manner—that is, multiple wells are screened simultaneously for antibiotic properties such as via, e.g., antibiotic susceptibility tests.

The next step occurs if the second activity, the activity of the supernatant, is determined to be greater than the undesirable first activity (and preferably if the second activity is the highest second activity of all wells being tested). At that time, a skilled artisan may then identify the elicitor or elicitors (130) used to generate the supernatant that resulted in that higher activity. For example, if the supernatant from well 3 in a 96-well array was identified as generating a significant bioactivity, the elicitors used in well 3 can then be identified. In some embodiments, all elicitors that produce a supernatant having a second activity greater than the first activity are identified. In some embodiments, on the elicitor(s) that produce a supernatant having the highest second activity are identified. In some embodiments, where multiple elicitors are identified, the process may optionally include identifying common features of the elicitors, such as arrangements of cyclic groups or substituents in the elicitors.

The final step occurs when a skilled artisan identifies the at least one molecule responsible for the higher second activity (140). For example, the supernatant for a cell grown in the presence of a given elicitor can be purified and molecules in the supernatant can be identified using techniques known to skilled artisans, including, e.g., Size Exclusion Chromatography, GC-MS, and/or NMR. Those results can be compared to supernatant for the cell under normal growth conditions, and one or more of the silent metabolites that were only present when the cell was grown in the presence of the given elicitor(s) can be identified.

Example 1

Several actinomycete bacteria were screened in a strain library, starting with *Streptomyces lavendulae*, *Amycolatop-* sis kerathiniphila, and *Streptomyces hiroshimensis*, the producers, among others, of streptothricin, keratinimicin, and prodigiosin, respectively.

In this example, all chemicals were purchased from Sigma-Aldrich. Bacterial media were purchased from Becton-Dickinson. Restriction enzymes, Q5 DNA polymerase, and T4 DNA ligase were obtained from New England Biolabs. Plasmid isolation, DNA gel extraction, and PCR purification kits were purchased from Qiagen. TSBY and R4 media were routinely used to culture the three actinomycete strains. TSBY (tryptic soy broth yeast extract) consisted of 3% (w/v) tryptone soy broth supplemented with 0.5% yeast extract. R4 medium consisted of 0.5% glucose, 0.1% yeast extract, 0.5% $MgCl_2 \cdot 6H_2O$, 0.2% $CaCl_2 \cdot 2H2O$, 0.15% proline, 0.118% valine, 0.28% TES, 50 mg/L casamino acid, 100 mg/L $K_2SO_4$, and 1× trace element solution (added from a 1000× stock: 40 mg/L $ZnCl_2$, 200 mg/L $FeCl_3 \cdot 6H2O$, 10 mg/L $CuCl_2 \cdot 2H2O$, 10 mg/L $MnCl_2 \cdot 4H_2O$, 10 mg/L $Na_2B_4O_7 \cdot 10H_2O$, 10 mg/L $(NH_4)_6Mo_7O_{24} \cdot 4H_2O$).

None produced an antibiotic under these experimental conditions in R4 growth medium. Each strain was then subjected to elicitor screening from a single 96-well plate of a larger, commercial natural products library.

For the high-throughput-elicitor screening portion of this example, the procedure is described for *S. hiroshimensis*. An identical procedure was used for *S. lavendulae* and *A. keratiniphila*. 15 μL of a spore stock suspension (~5×10⁶ spores per mL) of *S. hiroshimensis*were used to inoculate 20 mL TSBY medium in a 125 mL Erlenmeyer flask. The culture was incubated at 30° C./250 rpm for two days. Then, the mycelia cell mass was pelleted by centrifugation, the supernatant discarded, and a stock solution of 100 mg/mL cell mass was generated in R4 medium. The stock solution was used to prepare the appropriate volume (see below) of R4 medium containing 0.5 mg/mL mycelia cell mass in a 250 mL Erlenmeyer flask. The suspension was homogenized by stirring at room temperature. Subsequently, a MultiFlow Dispenser (from Biotek, Inc.) was used to dispense 150 μL of the suspension into each well of six sterile round bottom 96 well plates (from Corning, Inc.). Candidate elicitors were added from a commercially-available 502-member Natural Products Library (from Enzo Life Sciences, Inc.) using a CYBI-WELL™ automated liquid transfer robot (from CyBio AG). A volume of 0.5 μL was transferred from the compound library into each well to give a final concentration of ~33 μM. Then each plate was covered with a BREATHE-EASY® sealing membrane (from MilliporeSigma) and cultured at 30° C./200 rpm for 5 days. Humidity was maintained in the shaker/incubator by incubating several flasks containing sterile water.

After growth of each strain under 80-96 different conditions, the supernatants were used directly in disc diffusion assays against *B. subtilis*. For the medium-throughput disc diffusion bioactivity assays, the elicitor plates were prepared as described above. The only difference was that a single elicitor plate was used per strain. After 5 days, each plate was spun down in a 96-well plate centrifuge and the supernatant from each well (15 μL) was manually spotted onto a sterile filter disc (Fisher Scientific). Once dry, the discs were placed onto a soft agar (~1%) plate (30×30 cm) inoculated with *B. subtilis* (~10⁷ cells/mL). The plate was incubated for 5-10 h at 37° C.

Figure 2:
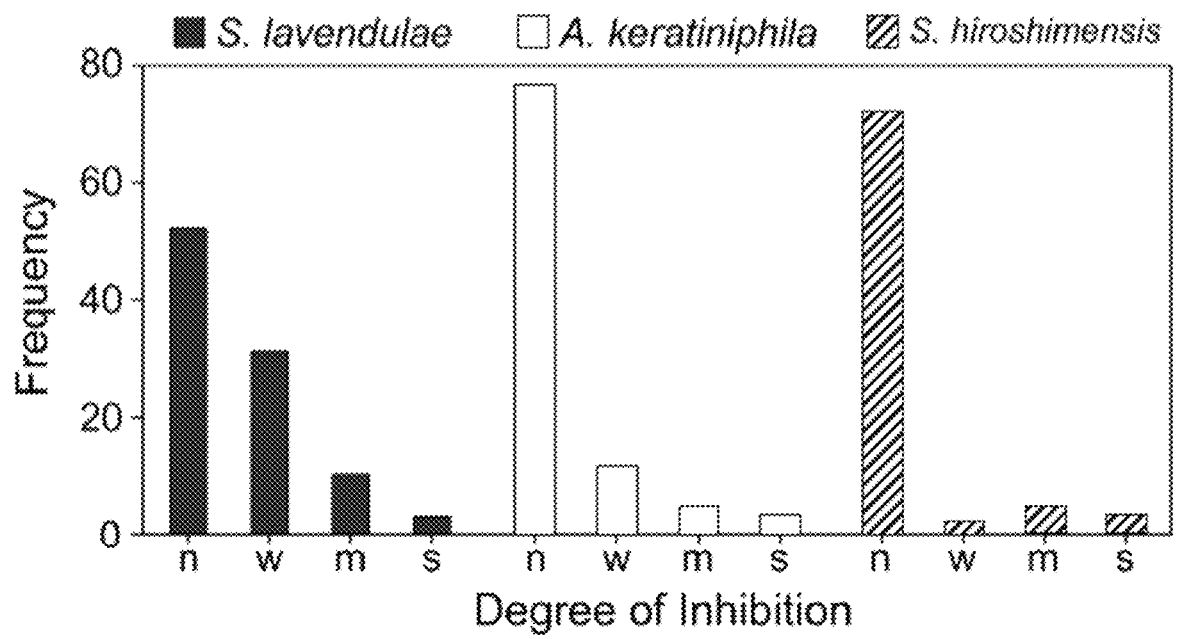
FIG. 2 is a graph summarizing the zones of inhibition observed from antibiotic-eliciting small molecules in which S. lavendulae, A. keratiniphila, and S. hiroshimensis were challenged with 80-96 elicitors and the resulting metabolomes were screened for antibiotic activity against B. subtilis.

The resulting agar plates were assessed visually, and subsequently examined visually for halos. To generate FIG. 2, the halo diameter, if any, was measured and categorized as none (n), weak (w), medium (m), or strong (s) inhibition. The size of the zones of inhibition observed correspond to: none (n), weak (w, 5-6 mm), medium (m, 6-7 mm), and strong (s, >7 mm). The frequency and size of growth-inhibition zones were tabulated. Somewhat surprisingly, even with this limited screen, a number of conditions were observed that gave rise to zones of inhibition (see FIG. 2).

Some of these were likely the result of residual antibiotics from the natural products library. But in most case, the elicitor was not known to exhibit antibiotic properties. For example, in *S. lavendulae,* 7,2'-dimethoxyflavone, isobutylmethylxanthine, and methoxyvone appeared to induce synthesis of anti-*B. subtilis* metabolite(s). For *A. keratiniphila*, baccatin III and isoscopoletin gave rise to zones of inhibition that were otherwise not observed. Lastly, with *S. hiroshimensis*, several clinical drugs, including the antimalarial primaquine and the anesthetic procaine appeared to elicit anti-*B. subtilis* metabolite(s). The stimulatory activities of these metabolites had previously not been reported.

Assays against *E. coli* were also carried out. In this case, broader elicitation screens were conducted using a ~500-member natural product library as the source of potential inducers. To increase the throughput of the assays, liquid bioassays were used. Rather than manually spotting each disc, the supernatants were screened by robotically transferring the supernatant from the elicitor plate to 96-well plates inoculated with the *E. coli* test strain.

Figure 3:
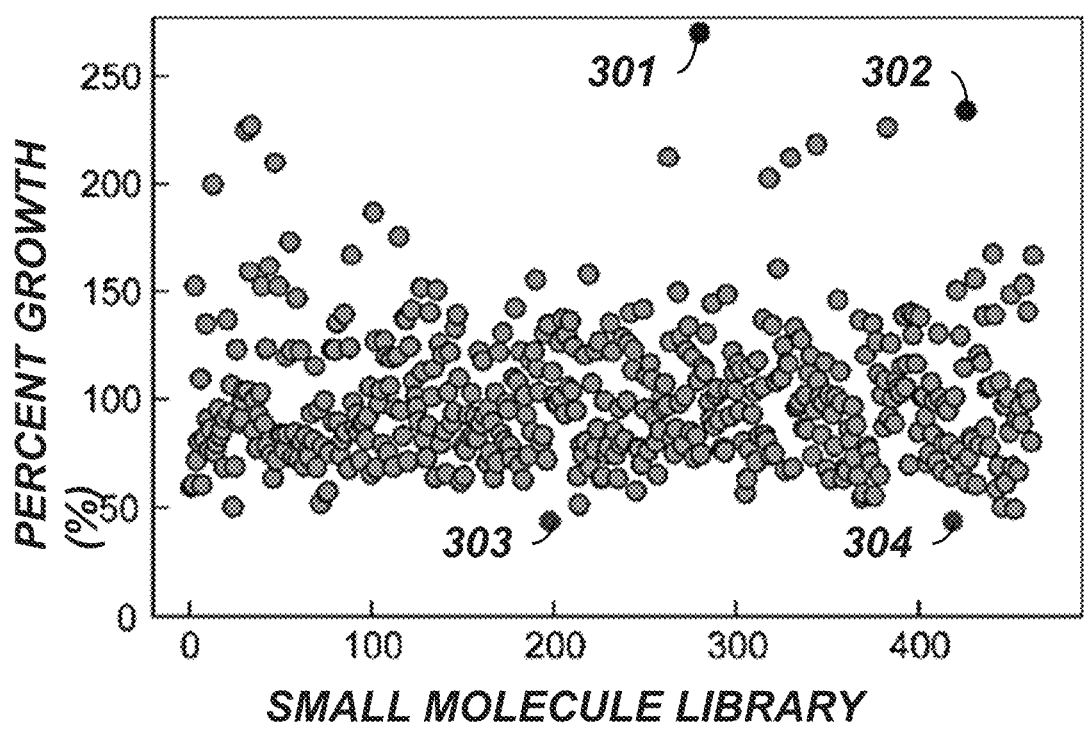
FIG. 3 is a plot of the observed growth of E. coli exposed to supernatant from S. lavendulae exposed to ~500-member natural product library. The highest stimulating (301, 302) and inhibiting (303, 304) supernatants are identified.

From the elicitor plates, after culturing for 5 days, the plates were spun down in a 96-well plate centrifuge and the supernatants (10 μL) transferred to fresh 96-well assay plates, each well containing 100 μL LB-*E. coli* culture, with the *E. coli* cells inoculated to an initial $OD_{600\ nm}$ $OD_{600\ nm}$ of 0.002. The assay plates were cultured at 37° C./200 rpm overnight (10-12 h) and $OD_{600\ nm}$ was then determined using a plate reader. To generate the plot in FIG. 3, the $OD_{600\ nm}$ from each well was divided by the average $OD_{600\ nm}$ from the entire plate and multiplied by 100 to give the percent growth. This normalization was carried out to account for plate-to-plate variation in growth rates. The results for the entire library are shown for *S. lavendulae* in FIG. 3. The two wells with the highest stimulation (301, 302) and highest inhibition (303, 304) are indicated. Similar results were seen with all bacterium tested, such as *A. keratiniphila* and *S. hiroshimensis*.

Across all three of the tested bacterium, most wells gave a value close to 100±30% growth, suggesting minimal effect on growth. Some induced metabolomes enhanced *E. coli* growth, while others inhibited it. With *S. lavendulae*, it was determined that metabolomes induced by the heart block agent isoproterenol and the bile acid chenodiol (301 and 302, respectively) seemed to support *E. coli* growth best, while those induced by inositol and allantoin inhibited it (303 and 304, respectively). Similarly, aspartame- and tandutinib-induced metabolomes of *A. keratiniphila* resulted in enhanced *E. coli* growth while those induced by the anti-HIV medication AZT and the anti-psychotic sulpiride seemed to produce growth-inhibitory compounds. Lastly, with *S. hiroshimensis*, the metabolomes that most enhanced *E. coli* growth were elicited by (i) aceclidine, an acetylcholine agonist used to treat glaucoma, (ii) glucosamine, and (iii) dexchlorpheniramine, a clinical antihistamine. The metabolomes that resulted in the lowest percent-growth, and inhibited *E. coli* growth best, were induced by (i) atenolol, a betablocker clinically used to treat hypertension, (ii) the Alzheimer drug memantine, and (iii) the ergot alkaloid methylergonovine.

Once the elicitor has been identified, the identification and production of cryptic metabolites that inhibit, e.g., *E. coli* growth can be verified. In this example, *S. hiroshimensis* was focused on, because relatively few studies have investigated its natural product output. The atenolol-induced metabolome was most effective at inhibiting *E. coli* and further experiments were carried out with this elicitor. The effects of atenolol was validated using disc diffusion assays and HPLC-MS analysis.

Seed cultures of *S. hiroshimensis* A18 were prepared as described for the HiTES screen above. Briefly, 15 µL of a spore stock suspension (~5×10$^6$ spores per mL) was used to inoculate 20 mL TSBY medium in a 125 mL Erlenmeyer flask. After two days, the pelleted mycelial cell stock was used to inoculate 20 mL of R4 medium in a 125 mL Erlenmeyer flask to a concentration of 0.5 mg/mL cell stock. Atenolol was added to from a DMSO stock to a final concentration of 33 µM. A control flask was prepared containing the same volume of DMSO, rather than atenolol. The culture was incubated at 30° C./200 rpm. After five days, the cell mass was removed by centrifugation and the resulting supernatant extracted twice with 30 mL of ethyl acetate. The organic phases were combined, divided in two, and dried in vacuo. The dried sample was dissolved in a small volume of methanol for LR-HPLC-MS analysis and DMSO for agar disc diffusion assays.

For the disc diffusion assays, the dried control and atenolol-treated culture extracts were dissolved in 100 µL of DMSO each. Filter paper discs were infused with 30 µL of each sample, allowed to dry, and then placed on a soft LB agar (1% agarose) plate inoculated with *E. coli* ZSR638 at a concentration of 2×10$^6$ cells/mL. The agar plate was incubated at 37° C. for 10 h and then inspected visually.

For the low-resolution HPLC-MS validations, dried control culture extracts were dissolved in 200 µL of MeOH each and filtered. Subsequently, 10 µL of each sample was analyzed by HPLC-MS (as described previously).

Figure 4A:
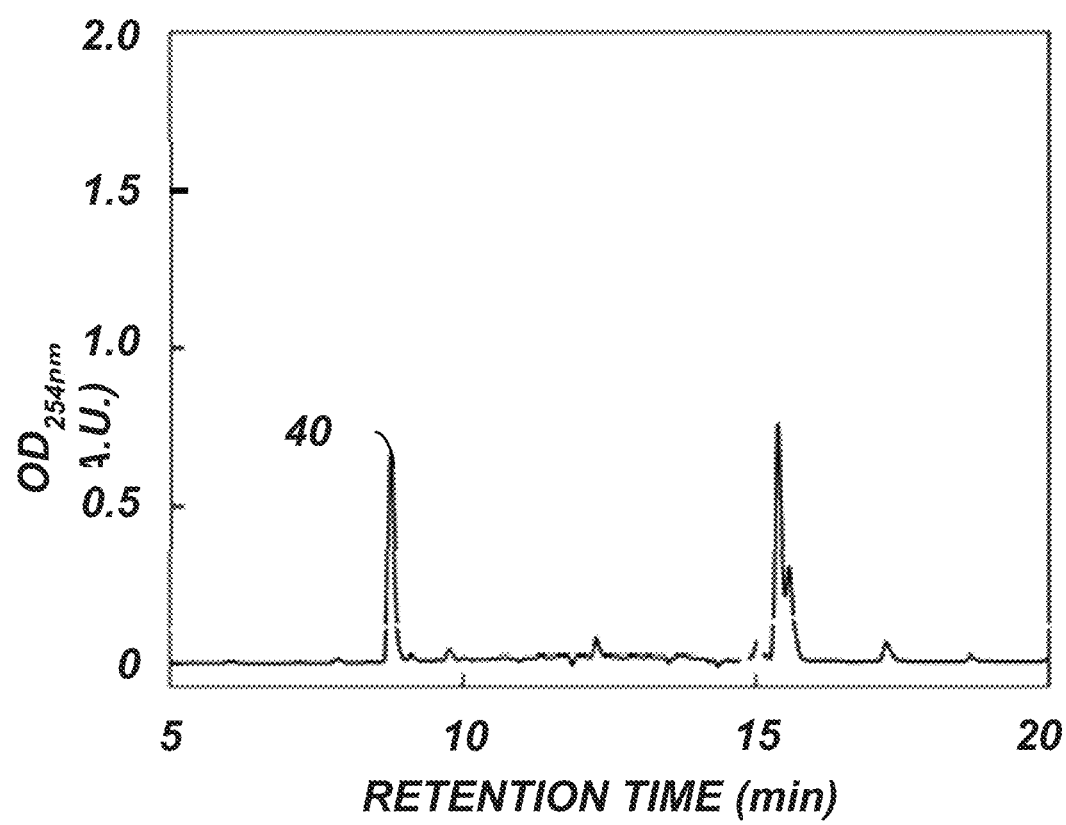
FIGS. 4A and 4B are comparative HPLC-MS profiles of S. hiroshimensis cultures grown in the absence (4A) or presence (4B) of 33 µM atenolol.
Figure 4B:
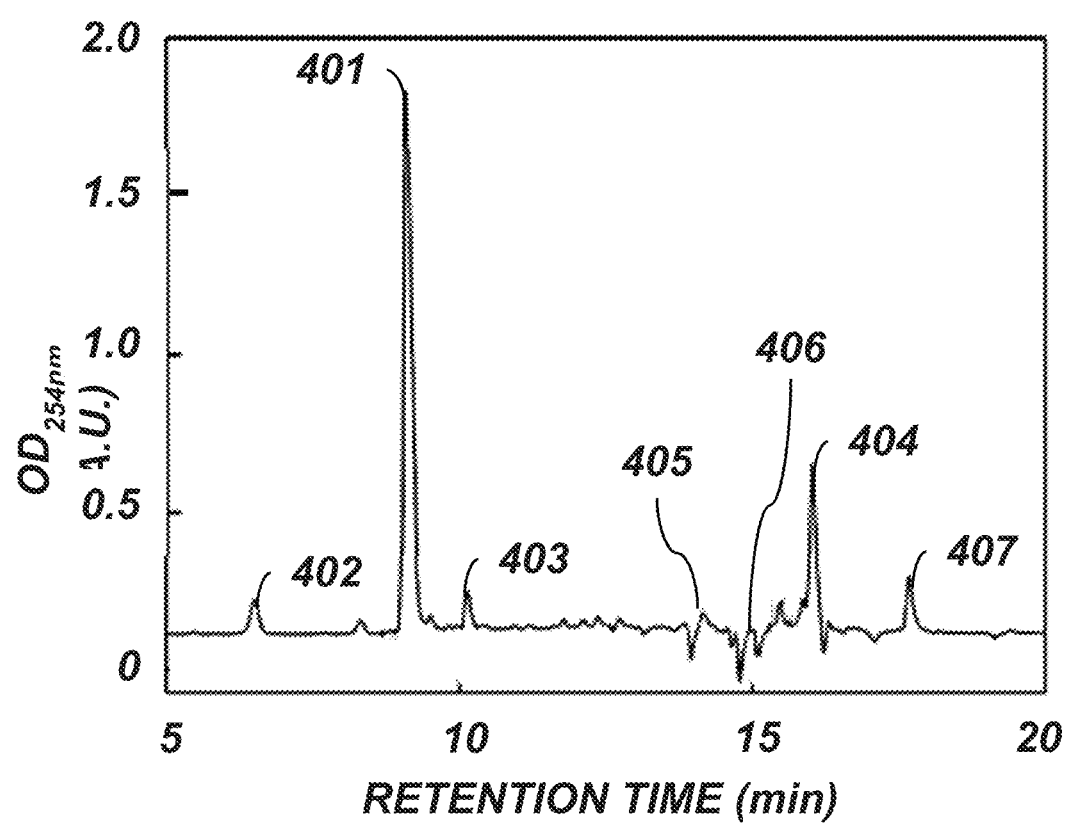

*S. hiroshimensis* culture supernatants induced by atenolol resulted in a clear zone of inhibition on *E. coli* agar plates and an orange hue, while uninduced cultures exhibited neither. Moreover, differential HPLC-MS profiling revealed numerous new peaks induced by the beta-blocker, indicative of global induction of secondary metabolism (FIGS. 4A, 4B). Much like other elicitors that we have explored in the past, atenolol too appears to have a pleiotropic effect on secondary metabolism in *S. hiroshimensis*.

One can determine the cryptic anti-*E. coli* antibiotic that was induced by atenolol and elucidate the structures of the additional cryptic metabolites. Here, referring to FIGS. 4A-4C, it was determined that a common peak (401) was induced by pyridindolol (9). The peak specific to the cryptic metabolites include, e.g., Taylorflavin A (7) and Taylorflavin B (8) (peak 402, similar retention times for both materials), Hiroshidine (12) (peak 403), and 6,7,8-Trimethoxy-3-methyisocoumarin (10) and 6,8-dihydroxy-3-methylisocoumarin (11) (peak 404, similar retention times for both materials). Several newly-induced metabolites remain unidentified (405, 406, 407). Qinimycin (13) is the closest structural homolog of hiroshidine (12).

Bioactivity assays of the induced peaks showed that the antibiotic activity was associated with compounds 7 and 8 (peak 402, Taylorflavin A and B).

Separately, the structures of the metabolites can be determined through, e.g., large-scale fermentation, isolation, and structure elucidation. Large-scale production cultures in the presence of atenolol followed by activity-guided fractionation allowed the purification of the two related metabolites. HR-MS suggested that both compounds were nitrogen-rich with predicted molecular formulas of $C_7H_7N_5O_3$ and $C_8H_9N_5O_3$. UV-vis ($\lambda_{max}$=~240 nm and 420 nm) and NMR analysis were in line with a 7-azapteridine scaffolds with three ketone carbon shifts at 149.8, 153.2, and 158.4 ppm in the first analog as well as two N-methyl groups with 1H shifts at 3.22 and 3.67 ppm. Detailed analysis of 1D/2D NMR data ultimately revealed that the two compounds consisted of a new toxoflavin-type analog (7) and 2-methylfervenulone (8), a metabolite that was previously isolated from an unidentified actinomycete. Interestingly, compound 8 and a series of other pyrimidine natural products were synthesized by Taylor and colleagues, a research program that culminated in the drug Alimta. These pyrimidine compounds were therefore named taylorflavin A and B, in honor of Ted Taylor.

Large-scale fermentation of *S. hiroshimensis* was carried out as described above. *S. hiroshimensis* spore stocks were used to inoculate a 250 mL Erlenmeyer flask containing 50 mL of TSBY seed medium. After growth for 2-3 days, the mycelial cell mass was isolated, and a 100 mg/mL mycelia cell stock was generated in R4 medium. This stock was used to inoculate 4×1 L R4 media (in 3.8 L Fernbach flasks) to an initial concentration of 0.5 mg/mL mycelium. The suspension was supplemented with a final concentration of 33 µM atenolol (from a DMSO stock). The four Fernbach flasks were cultured for five days at 30° C./200 rpm. After five days, the cells mass was removed by centrifugation and the supernatant applied directly to a manually-prepared C18 open-column (Phenomenex, 5 µm, 10 g). After application of the supernatant, the column was washed with 150 mL each of 20%, 40%, 60%, 80%, and 100% MeOH in water. Each fraction was dried in vacuo. Taylorflavin A (7) and B (8) were detected in the 20% fraction, pyridindolol (9) and hiroshidine (12) were found in the 40% and 60% fractions, and 6,7,8-trimethoxy-3-methylisocoumarin (10) and 6,8-dihydroxy-3-methylisocoumarin (11) were identified in the 80% fraction. Taylorflavin A (7) and B (8) were purified at a retention time of 10 and 25 min, respectively, by HPLC on a semi-preparative Phenyl-Hexyl column (Phenomenex, 5 µm, 10×250 mm) operating at flow late 2 mL/min with a 10% aqueous acetonitrile isocratic step (0.1% formic acid). Hiroshidine (12) was obtained at 30 min by HPLC with a semi-preparative Luna C18 column (Phenomenex, 5 µm, 10×250 mm), operating at flow rate 2 mL/min and a gradient 10-40% aqueous acetonitrile (0.1% TFA) over 30 min. 6,7,8-Trimethoxy-3-methylisocoumarin (10) was purified by HPLC with the same Luna C18 column using 55% aqueous acetonitrile isocratic solvent (0.1% formic acid), where it eluted at 23 min. Pure taylorflavin A (1.2 mg), taylorflavin B (3.0 mg), 6,7,8-trimethoxy-3-methyl-isocoumarin (3.2 mg), and hiroshidine (2.4 mg) were obtained using these procedures.

The structures of compounds 7-12 were determined by analysis of 1D ($^1$H and $^{13}$C) and 2D (gCOSY, NOESY, HSQC and HMBC) NMR spectra (7, 8, 10, 12) and/or HPLC-MS data (9, 11).

In-house bioactivity assays showed taylorflavin B to be a more potent inhibitor of *E. coli* growth. This compound was submitted for broad bioactivity assays against a battery of pathogenic bacteria; a more limited set was tested with taylorflavin A.

Antibacterial assays with taylorflavin B (8) were carried out by Micromyx, LLC in accordance with methods from the Clinical and Laboratory Standards Institute. Minimal inhibitory concentrations were determined with the following strains: *E. coli* ATCC 25922, *A. baumannii* ATCC 19606, *V. cholerae* BAA-2163, *N. gonorrhoeae* ATCC 49226, *P. aeruginosa* ATCC 27853, *K. pneumoniae* MMX 214. *S. aureus* ATCC 29213, *S. aureus* MMX 2011, *S.* pneumoniae ATCC 49619, *S. pyogenes* MMX 6253, *S. agalactiae* MMX 6189, *E. faecalis* ATCC 29212, *E. faecalis* MMX 486, *B. subtilis* ATCC 6633, *C. difficile* ATCC 700057, *B. fragilis* ATCC 25285. Assays with taylorflavin A (7) were carried in-house according to the same protocols.

Consistent with the screen, the results yielded minimal inhibitory concentrations (MICs) of 4 μg/mL against *Neisseria ghonorrheae* and 16 μg/mL against *E. coli, Acinetobacter baumannii*, and *Vibrio cholerae* for taylorflavin B (Table 1). Conversely, the antibiotic did not inhibit the growth of a collection of Gram-positive bacteria. Likewise, taylorflavin A displayed MICs of 25 μg/mL and 37.5 μg/mL against *P. aeruginosa* and *E. coli*, respectively. Significantly weaker activity was observed against *B. subtilis* and *S. aureus* (Table 1). In contrast to most antibiotics, the taylorflavins exhibited Gram-negative-selective antibacterial activity. These results validate the use of Bioactivity-HiTES for the discovery of cryptic antibiotics.

TABLE 1

| Bacterium | Taylorflavin A | Taylorflavin B |
| --- | --- | --- |
| Gram-Negative | | |
| E. coli | 37.5 | 16 |
| A. baumannii | n.d. | 16 |
| V. cholerae | n.d. | 16 |
| N. gonorrhoeae | n.d. | 4 |
| P. aeruginosa | 25 | >64 |
| K pneumoniae | n.d. | >64 |
| Gram-Positive | | |
| S. aureus | >64 | 64 |
| S. aureus MRSA | n.d. | 64 |
| S. pneumoniae PSPP | n.d. | 32 |
| S. pyogenes | n.d. | 32 |
| S. agalactiae | n.d. | 32 |
| E. faecalis VSE | n.d. | >64 |
| E. faecalis VRE | n.d. | 64 |
| B. subtilis | >64 | 64 |
| C. difficile | n.d. | >64 |
| B. fragilis | n.d. | >64 |

Pleiotropic Stimulation of Secondary Metabolism. Differential metabolic profiling shows that atenolol is not a specific inducer of the toxoflavin-like pteridines, but rather a global elicitor of secondary metabolism (FIG. 4B). As few metabolites have been reported from *S. hiroshimensis*, one can characterize the additional compounds observed in the presence of atenolol.

1D/2D NMR and/or HR-MS identified one of these, produced under normal conditions but further induced by atenolol, as pyridindolol (FIG. 4C, ref 9), a secondary metabolite previously isolated from *Streptomyces alboverticillatus* with inhibitory activity against β-galactosidase.

Figure 4C:
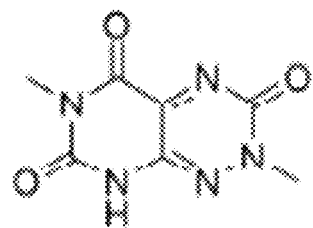
FIG. 4C is a chart showing structural formulas of taylorflavins, pyridindolol, two isocoumarins and hiroshidine that were identified from atenolol-induced S. hiroshimensis cultures.
Figure 4C:
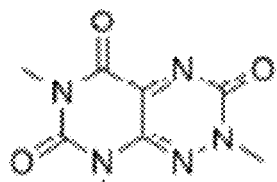
Figure 4C:
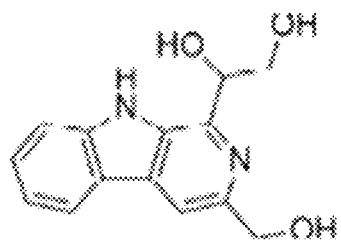
Figure 4C:
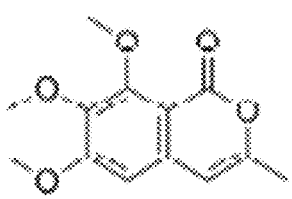
Figure 4C:
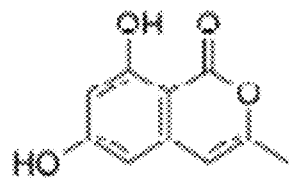
Figure 4C:
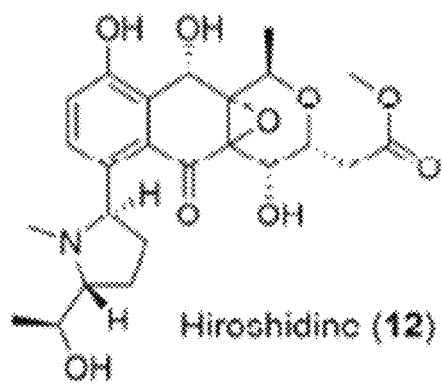
Figure 4C:
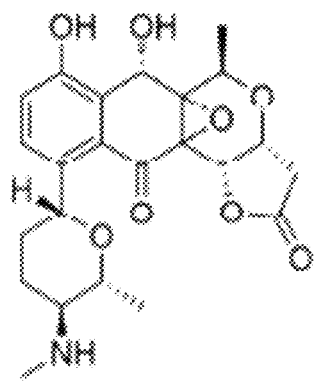

Two further metabolites, whose production was also enhanced by atenolol, were determined to be 6,7,8-trimethoxy-3-methylisocoumarin (10) and 6,8-dihydroxy-3-methylisocoumarin (11), previously isolated from *Streptomyces* sp. ANK302 with zoosporicidal, but lacking antibacterial bioactivity Focusing on peak 403 (FIG. 4B), initial analysis by HR-MS and comparison with a database of known natural products indicated that it was likely new. Structural elucidation by 1D/2D NMR revealed a naphthoquinone-type scaffold that was fused to a substituted tetrahydropyran group. 13C and HMBC were consistent with the presence of an epoxide group bridging the pyrano and naphthoquinone moieties, with characteristic 13C shifts at 61.9 and 66.8 ppm. The naphthoquinone was modified with a spin system containing a contiguous, substituted —CH—CH2—CH2—CH—CH—CH3— chain as revealed by COSY spectra. HSQC and HMBC analysis indicated it consisted of an N-methyl-1-hydroxyethylsubstitued pyrrolidine, thus completing the two-dimensional structure of the compound, to which we have assigned the trivial name hiroshidine (FIG. 4C, ref 12). Hiroshidine's structure is closest to qinimycin A (FIG. 4C, ref 13), recently identified by the van Wezel group from *Streptomyces* sp. MBT76.31 It contains 9 stereocenters. Preliminary attempts to crystallize hiroshidine failed. Based on NMR NOESY constraints, the relative stereochemistry shown for some of the stereocenters can be proposed.

Biosynthetic Gene Clusters for Taylorflavins and Hiroshidine. Given the unusual structural features of taylorflavins and hiroshidine, the BGCs for the two groups of metabolites can be investigated. Without being held to theory, it is suspected that taylorflavins may follow a similar biosynthetic pathway as toxoflavin, which has been shown be composed of GTP and Gly.

Indeed, growth of *S. hiroshimensis* in the presence of atenolol and 2-13C-Gly revealed taylorflavins that were now 1 Da heavier, consistent with incorporation of Gly. This result suggested that one could identify the taylorflavin cluster by scouring the genome of *S. hiroshimensis* for genes encoded in the toxoflavin cluster (tox).

To find a tox-like cluster, the genome sequence of *S. hiroshimensis* was determined with 70-fold coverage using Illumina sequencing technology, resulting in a single chromosome at 8.4 Mbp. Analysis by antiSMASH revealed a total of 47 BGCs, suggesting that *S. hiroshimensis* harbors a prolific potential for secondary metabolite synthesis. The BGC of toxoflavin has been characterized in *Burkholderia glumae* and *Pseudomonas protegens* and the reactions of some of the enzymes have been examined in vitro.

To sequence, *S. hiroshimensis* A18 was cultured in 50 mL TSBY medium for two days, as described above. Then, the mycelium was collected by centrifugation and genomic DNA isolated using the Promega Wizard Genomic DNA Purification Kit as per manufacturer's instructions. Genomic DNA of high quality was obtained at a concentration of 1.1 μg/μL and a UV260/280 value of 1.9. The genomic DNA of *S. hiroshimensis* A18 was sent to the Lewis Sigler Institute Sequencing Core Facility, where short DNA fragment libraries were prepared via an Illumina MiSeq Reagent Kit, and the fragments then sequenced on an Illumina MiSeq System. The raw sequence data were assembled with Unicycler software. A total of 86 contigs covering 8.4 Mbp sequence were obtained. Genome annotation analysis was conducted via the RAST server 2.0. The obtained data were then searched using the reported toxoflavin (toxB from *P. protegens*) and qinimycin (qin19 from *Streptomyces* sp. MBT76) biosynthetic gene clusters as queries. Each search delivered a single high-scoring hit, which allowed us to identify the clusters and determine cluster boundaries. In each cluster, the predicted protein functions were assigned using the IMG and antiSMASH databases. The sequence for the whole tfl/tox and hrs gene clusters were uploaded to NCBI (accession number MH743142 and MH743143, respectively).

Figure 5A:
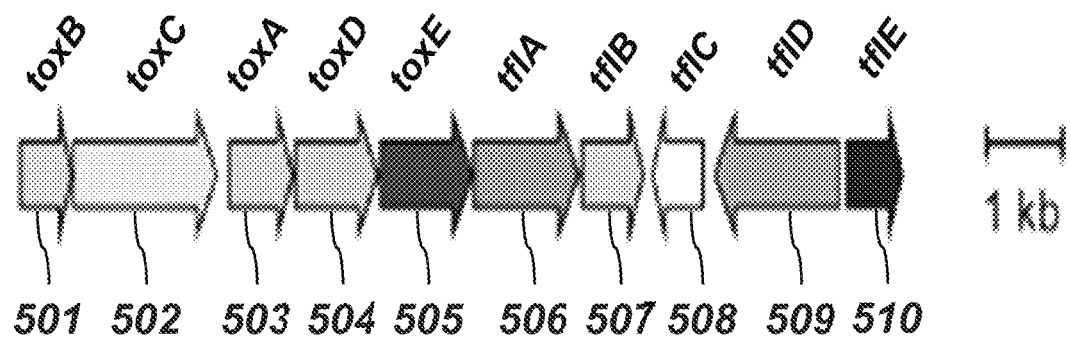
FIG. 5A is a depiction of biosynthetic gene clusters for taylorflavins, with the to/tox BGC consisting of genes tflABCDE as well as toxABCDE, which are shared with the tox gene cluster.

The biosynthetic pathway begins with the action of a GTP cyclohydrolase encoded by toxB. The genome of *S. hiroshimensis* can be searched using toxB from *Pseudomonas protegens* Pf-5 as query and obtained a single hit. Several genes involved in toxoflavin biosynthesis could be identified, including toxA (SAM-dependent methyltransferase (503)), toxB (GTP cyclohydrolasell (501)), toxC (WD40-repeat protein (502) with yet unknown function), toxD (serine/threonine kinase (504)), and toxE (a ribD homolog (505)) (FIG. 5A). Unique to this cluster were a second putative SAM-dependent methyltransferase (tflA) (506), a Ser/Thr kinase (tflB) (507), an ORF lacking similarity to known proteins (tflC) (508), an oxidoreductase (tflD) (509), possibly involved in introduction of the additional carbonyl functionality, and a transcriptional regulator (tflE) (510).

Figure 5B:
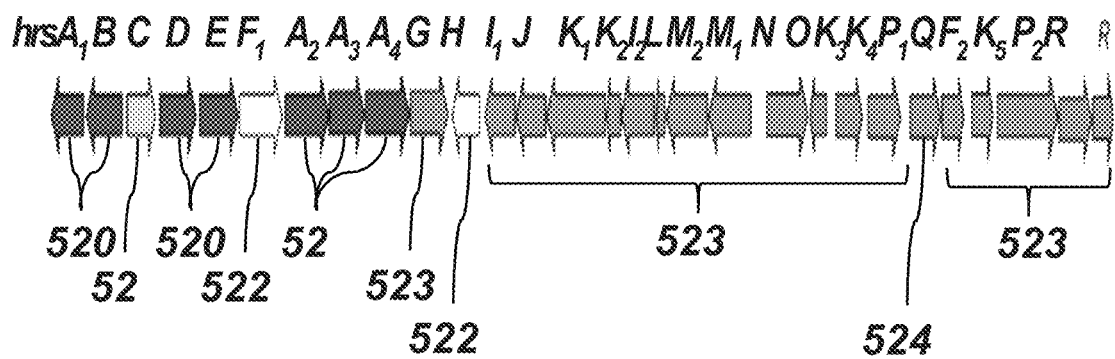
FIG. 5B is a depiction of biosynthetic gene clusters for hiroshidine.

To find the hiroshidine BGC, a type II polyketide synthase (PKS) from the qinimycin gene cluster (qin) in *Streptomyces* sp. MBT76 was used as query. A single hit inside a ~40 kb gene cluster was obtained, containing many of the same genes as the qin BGC. As seen in FIG. 5B, this cluster, which is annotated as hrs, is significantly smaller than qin, but encodes type II PKSs (523) as well as a number of genes involved in sugar biosynthesis (520) and other modifications, including methyltransferase (521), hypothetical proteins (522), and quinone oxidoreductase (524).

A biosynthetic pathway for qinimycin has been proposed but awaits experimental verification. In this example, a genetic approach was used to verify that the two gene clusters tfl/tox and hrs code for taylorflavins and hiroshidine, respectively. The tfl/tox locus was inactivated by replacing the six genes between toxB-tflA with an apramycin resistance gene (apr) using insertional mutagenesis, thus giving rise to a toxB-tflA::apr mutant. Likewise, hrsC-hrsJ::apr was generated to investigate the role of the hrs BGC in hiroshidine production.

To generate a tfl/tox gene deletion, ~2 kb regions upstream of toxB and ~2 kb downstream of tflA were amplified using appropriate primers and digested with BamHI/EcoRI and HindIII/KpnI respectively. The apramycin resistance gene (apr) fused to oriT was amplified by PCR with appropriate primers from vector pIJ773. This was then digested with EcoRI/HindIII to give a 1.6 kb insert. Then each of the three fragments obtained was in turn cloned into pJTU1289 (which carries the thiostrepton marker, $Tsr^R$) to create a plasmid construct containing a fragment that comprises 2-kb-up-toxB_oriT-apr_2-kb-dn-tflA. This plasmid (pΔtoxB-tflA) was amplified in *E. coli* DH5α cells and introduced into *E. coli* ET12567 by heat shock transformation. Conjugation of this transformed *E. coli* strain with *S. hiroshimensis* was carried out as described below.

To create the plasmid for large-fragment deletion within the hrs cluster, a similar strategy as above was employed: 2 kb regions upstream of hrsC and downstream of hrsJ were amplified using the appropriate primers, and subsequently digested with BamHI/EcoRI and HindIII/KpnI, respectively. The apramycin resistance gene (apr) fused to oriT was amplified by PCR with the appropriate primers from vector pIJ773. This was then digested with EcoRI/HindIII to give a 1.6 kb insert. Then each of the three fragments obtained was in turn cloned into pJTU1289 to create a plasmid construct containing a fragment that comprises 2-kb-up-hrsC_oriT-apr_2-kb-dn-hrsJ. This plasmid (pΔhrsC-hrsJ) was amplified in *E. coli* DH5α cells and introduced into *E. coli* ET12567 by heat shock transformation.

Conjugation of both gene deletion plasmids into *S. hiroshimensis* used the following protocol: Each plasmid ($Tsr^R$, $Apr^R$) was transformed into *E. coli* ET12567 ($Cm^R$), which also carries the mobilizing vector pUZ8002 ($Kan^R$),[1-3] as mentioned above. Then, *E. coli* ET12567 containing the desired plasmids was cultured in LB containing Apr (50 µg/mL), Kan (50 µg/mL), and Cm (25 µg/mL) to an $OD_{600 nm}$ of ~0.4. The cells were collected by centrifugation and washed with LB to remove the antibiotics. These were resuspended in ~0.5 mL LB to be used later in the protocol.

Spores of *S. hiroshimensis* were grown on ISP-2 medium (yeast extract: 0.4% (w/v), malt extract: 1%, dextrose: 0.4%, Agar: 2%, pH=7.2) and isolated using standard methods. *S. hiroshimensis* spores were washed with TES buffer (50 mM, pH 8.0), collected, resuspended in 500 µL TES buffer, and heat-shocked at 50° C. for 10 min. The spores were then supplemented with 500 µL of 2× spore-activating media (yeast extract: 1% (w/v), casein hydrolysate: 1%, $CaCl_2$: 5 mM), and then cultured at 37° C. for 3 h. The spore stocks were then collected by centrifugation, resuspended in ~0.5 mL of LB and mixed with the *E. coli* cells that were also resuspended in 0.5 mL of LB (see above). The suspension was then plated on SFM agar plates (which consists of 2% (w/v) soybean meal prepared in tap water, which is sterilized by autoclaving, filtered, and then mixed with 2% mannitol and 2% agar, and then autoclaved again). The plates were grown at 30° C. for 16-20 h. The single-site integration mutants were selected with 25 µg/mL thiostrepton, 35 µg/mL Apr, and 50 µg/mL trimethoprim (to kill the *E. coli* donor strain). For selection of double-crossover mutants, the exconjugants were picked and cultured in YEME medium without any antibiotics. Surviving cells were subcultured again in YEME medium. They were then diluted to obtain single colonies on SFM agar plates. The colonies were tested individually and separately for Apr resistance and Tsr-susceptibility. The mutants that satisfied both criteria were tested by PCR for the absence of the toxB and hrsD gene, thus delivering the toxB-tflA::apr and hrsC-hrsJ::apr strains. These were then tested in small scale fermentations as described below.

The wt and both mutants were subsequently cultured in the presence of atenolol and the supernatants examined by HPLC-MS. Specifically, frozen spore stocks of wild type *S. hiroshimensis* A18 as well as mutant strains toxB-tflA::apr and hrsC-hrsJ::apr were used to inoculate into 3 mL of TSBY medium in separate 14 mL bacterial culture tubes, which were then incubated at 30° C./200 rpm for two days. The isolated mycelial cell mass was then diluted into 20 mL of R4 medium (in a 125 mL Erlenmeyer flask) to a final concentration of 0.5 mg/mL. The cultures were grown at 30° C./200 rpm for 5 days in the presence of 33 µM atenolol, and then cells were removed by centrifugation. The resulting supernatant was extracted twice with 30 mL of ethyl acetate. The organic phases were combined for each strain, dried in vacuo, dissolved in 400 µL MeOH, and analyzed by LR-HPLC-ESI-MS using an analytical Luna C18 column (Phenomenex, 5 µm, 4.6×100 mm) operating at 0.5 mL/min with a gradient of 10% MeCN in $H_2O$ to 100% MeCN over 20 minutes (mobile phase of water and MeCN contain 0.1% formic acid).

In the wt, one could clearly see production of both metabolites. In the toxB-tflA::apr strain, production of taylorflavins was abolished, though hiroshidine was observed under these conditions. Similarly, hiroshidine was not observed in the hrsC-hrsJ::apr strain, though it was induced in both the wt and toxB-tflA::apr strains in response to atenolol. These results are consistent with a role for the tfl/tox and hrs clusters in biosynthesizing taylorflavins and hiroshidine, respectively.

Example 2

It is recognized that wild-type *S. cebuensis* does not synthesize antibacterial compounds under standard/normal laboratory conditions that inhibit *E. coli* growth. Wild-type *S. cebuensis* cultures were transferred to 96 well-plates and each well was robotically supplemented with a compound from a commercial small molecule library as a source of elicitors. The library consisted of 950 bioactive compounds of diverse structures and origins, which at the concentration used did not exhibit antibiotic activity against E. coli. To grow the cells, the plates were incubated for a defined period.

To screen the supernatant, the supernatants were transferred to 96-well plates carrying E. coli cultures, and optical density at 600 nm ($OD_{600\ nm}$) was then measured as a proxy for production of cryptic, growth-inhibitory compounds. The OD600 nm from each well was normalized and the % E. coli growth thus obtained was plotted as a function of each elicitor, allowing one to identify at least one elicitor corresponding to a second activity greater than the first activity.

Most wells gave a value close to 100±30%, suggesting minimal effect on E. coli growth. Some induced metabolomes enhanced E. coli growth, while others inhibited it. For example, metabolomes induced by the antithyroid agent methimazole, the laxative Na-docusate, and the nootropic piracetam stimulated E. coli growth best, while those induced by the anesthetic procaine, the clinical diuretic furosemide, and the cholesterol lowering agent fenofibrate inhibited it.

In this example, further efforts were focused on the production of a potential antibiotic induced by the inhibition-inducing elicitors. Due to restrictions, procaine could not be tested. The effect of furosemide and fenofibrate on the secondary metabolome of S. cebuensis was investigated using agar disc diffusion assays and differential metabolic profiling. The former showed a halo of growth-inhibition only from supernatants generated with furosemide, consistent with the production of a cryptic antibiotic. In line with this conclusion, HPLC-MS profiling revealed appearance of several induced metabolites in the cultures treated with furosemide or fenofibrate.

Specifically, cultures of S. cebuensis strain SPE 10-1$^T$ were grown in the presence of DMSO (control) or furosemide and the filtered supernatants were subjected them to antibacterial assay screens or assessment by HPLC-MS. All chemicals were purchased from Sigma-Aldrich. Bacterial media were purchased from Becton-Dickinson. Marine Broth or R4 medium in Sigma Sea Salt (R4-SS medium) were used to culture S. cebuensis. The latter consisted of 0.5% glucose, 0.1% yeast extract, 0.5% $MgCl_2.6H2O$, 0.2% $CaCl_2.2H2O$, 0.15% proline, 0.118% valine, 0.28% TES, 50 mg/L casamino acid, 100 mg/L $K_2SO_4$, 1× trace element solution [40 mg/L $ZnCl_2$, 200 mg/L $FeCl_3.6H_2O$, 10 mg/L $CuCl_2.2H_2O$, 10 mg/L $MnCl_2.4H2O$, 10 mg/L $Na_2B_4O_7.10H_2O$, 10 mg/L $(NH_4)_6Mo_7O_{24}.4H_2O$], and 20 g/L Sigma Sea Salt.

Low resolution HPLC-MS analysis was performed on a 1260 Infinity Series HPLC system (Agilent) equipped with an automated liquid sampler, a diode array detector, and a 6120 Series ESI mass spectrometer using an analytical Luna C18 column (Phenomenex, 5 µm, 4.6×100 mm) operating at 0.5 mL/min with a gradient of 10% MeCN in $H_2O$ to 100% MeCN over 20 minutes. Both MeCN and $H_2O$ contained 0.1% (v/v) formic acid. High-resolution (HR) HPLC-MS and HR-tandem HPLC-MS were carried out on a 6540 UHD Accurate Mass Q-tof LC-MS system (Agilent), consisting of a 1260 Infinity Series HPLC system, an automated liquid sampler, a diode array detector, a Jet Stream ESI source, and the 6540 Series Q-tof. HPLC purifications were carried out on an Agilent 1260 Infinity Series analytical or preparative HPLC system equipped with a photodiode array detector and an automated fraction collector. NMR spectra were collected at the Princeton Chemistry NMR Core Facility in a Bruker Avance III HD 800 MHz equipped with a triple resonance cryoprobe or a Burker 500 MHz NMR spectrometer equipped with a $^1H$-optimized cryoprobe.

Figure 6:
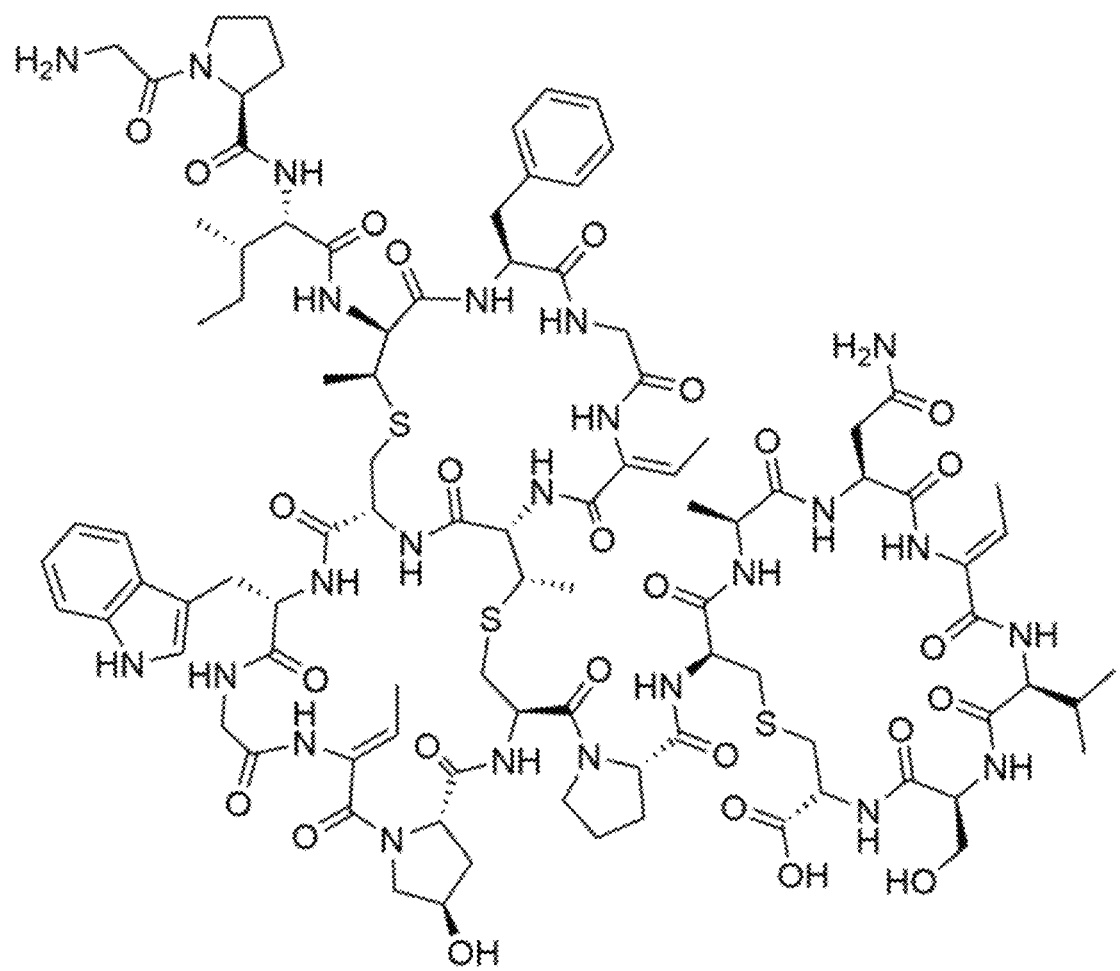
FIG. 6 is the chemical structure of cebulantin.

Iterative activity-guided fractionation of the induced supernatants identified one peak as the bioactive component with an [M+H]+ obs of 2107.8798 and a UV spectrum consistent with the presence of a Trp residue. Searches in a database of known natural products did not reveal any hits suggesting that this compound (FIG. 6), which has been named cebulantin, was a novel natural product.

Specifically, HPLC-MS assays of S. cebuensis cultures grown in the presence of the inhibition-inducing elicitors, or DMSO control, revealed cebulantin only in the presence of the elicitors, consistent with the screening results and the cryptic nature of the cebulantin BGC.

Cebulantin was purified from large-scale production cultures of S. cebuensis grown in the presence of furosemide, which allows for the isolation of, e.g., ~3 mg of the antibiotic (from 6 L) and to elucidate its structure using 1D/2D NMR spectroscopy and HRMS. Analysis of 1H, TOCSY, and COSY spectra revealed spin systems consistent with canonical amino acids, an unusual 4-hydroxy-Pro, and several dehydrated Thr residues (dehydrobutyrine, Dhb), which were identified using the characteristic olefin 1H and 13C shifts, suggesting that cebulantin was a new, cryptic lanthipeptide COSY (NH—CHα) and HMBC (CHα—C=O or CHβ—C=O) cross-peaks allows the mapping of the sequence of the entire 22mer peptide. HMBC and NOESY data indicated that residues 4-9, 8-14, and 16-22 were connected via β-thioether bonds, thus completing the 2D structure of cebulantin (see FIG. 6), which was in line with HR-MS/MS data. The stereochemistry at the methyllanthionines was derived using NOESY data analysis. While consistent with the (2S,3S)-configuration in previous lanthipeptides, additional experiments are needed to confirm. Together, these results identifying cebulantin as a cryptic lanthipeptide induced by specific elicitors, the clinical drugs furosemide and fenofibrate, with cebulantin being responsible for the second activity being greater than the first activity.

As seen in Table 2, bioactivity screens gave half-maximal inhibitory concentrations (IC50s) of 9.7 µM against E. coli (ΔlptD) and between 8.8-29.1 µM against several Vibrio strains. On the other hand, cebulantin exhibited no growth-inhibitory activity toward the Gram-positive bacteria tested, providing an unusual example of an antibiotic that appears to be selective for Gram-negative strains, especially the various pathogens of the Vibrio genus.

TABLE 2

$IC_{50}$ values (in µM) of cebulantin against select bacteria.

| Bacterium | IC50 |
|---|---|
| Gram-Negative | |
| E. coli (ΔlptD) | 9.7 ± 0.4 |
| V. parahaemolyticus | 8.8 ± 2.1 |
| V. cholerae | 14.1 ± 2.4 |
| V. alginolyticus | 24.5 ± 3.2 |
| V. ordahi | 27.0 ± 5.4 |
| V. anguillarum | 29.1 ± 8.2 |
| P. aeruginose | 47.0 ± 11.4 |
| Gram-Positive | |
| S. aureus | >100 |
| B. subtilis | >100 |

The structure of cebulantin should facilitate the identification of its BGC. Using Illumina sequencing technology, a draft sequence of the *S. cebuensis* genome with 100-fold coverage was determined, resulting in a single chromosome of 6.7 Mbp. Analysis by anti SMASH gave a total of 23 BGCs, almost half of these in the RiPP (ribosomally-synthesized and posttranslationally modified peptide) subfamily, suggesting that, aside from cebulantin, *S. cebuensis* is a rich source of potentially new RiPPs. By scanning the precursor peptide sequences of lanthipeptide BGCs, one gene was found that gave a perfect match to the C-terminal 22 residues of cebulantin. It encodes two precursor peptides, cebA1 and cebA2, the canonical LanB-like dehydratase (cebB) and LanClike cyclase (cebC), which have been shown to install lanthionine bridges, a luciferase-like monooxygenase (cebO), which may be involved in the biosynthesis of 4-OH-Pro, and an ATP dependent transporter (cebT). The ceb cluster appears to be under the control of a two-component regulatory system.

In addition to producing and identifying cryptic, bioactive metabolites, also disclosed is a method of producing a cryptic, bioactive metabolite. Referring to FIG. 1, the method includes eliciting the production of a bioactive metabolite by growing a cell in the presence of at least one elicitor (110), where (a) the cell is *S. cebuensis* and the elicitor is furosemide or fenofibrate, (b) the cell is *S. lavendulae* and the elicitor is 7,2'-dimethoxyflavone, isobutylmethylxanthine, or methoxyvone, (c) the cell is *A. keratiniphila*, and the elicitor is baccatin III or isoscopoletin, or (d) the cell is *S. hiroshimensis*, and the elicitor is primaquine or procaine.

Supernatant containing the bioactive metabolite is then generated by lysing the grown cell (115). The bioactive metabolite can then be purified (117) using standard, known techniques.

The taylorflavins and cebulantin, or derivatives thereof, can be used as antimicrobial agents, or for treating infections in a subject from certain microbial pathogens. The derivatives include, but are not limited to, substitutions to a taylorflavin or to cebulantin that are readily understood by medicinal chemists. Specifically, these agents or derivatives may be used against a gram-positive or a gram-negative pathogen. Preferably, they are used against a gram-negative pathogen. These agents or derivatives can be provided in such a way that they can come into contact with the pathogen. In some embodiments, a surface may be sprayed or wiped down with a fluid comprising one or more of the antimicrobial agents. In some embodiments, a pharmaceutical composition may be prepared, comprising one or more of the antimicrobial agents, and a pharmaceutically acceptable carrier. In some embodiments, the pharmaceutical composition is then administered to a subject, such as a human.

In some embodiment, one or more disclosed antimicrobial agents or derivatives is co-administered with another pharmaceutical agent. In some embodiments, a composition comprising one or more disclosed antimicrobial agents or derivatives also comprises an additional antimicrobial agent (not a taylorflavin, cebulantin, or derivative) and/or a pharmaceutical agent.

Those skilled in the art will recognize, or be able to ascertain using no more than routine experimentation, many equivalents to the specific embodiments of the invention described herein. Such equivalents are intended to be encompassed by the following claims.

What is claimed:

1. A method for inhibiting growth of a Gram-negative pathogen, comprising:
   providing a composition comprising a first antimicrobial agent to a location containing a Gram-negative pathogen, the first antimicrobial agent comprising taylorflavin A, or cebulantin, and
   allowing the first antimicrobial agent to come into contact with the Gram-negative pathogen,
   wherein either:
   the Gram-negative pathogen is *P. aeruginosa* or *E. coli* and the first antimicrobial agent is taylorflavin A, or
   the Gram-negative pathogen is *E. coli*, *V. parahaemolyticus*, *V. cholerae*, *V. ordalii*, *V. anguillarum*, or *P. aeruginosa* and the first antimicrobial agent is cebulantin.

2. The method according to claim 1, wherein the composition further comprises a second antimicrobial agent different from the first antimicrobial agent.

3. The method according to claim 1, wherein the composition further comprises a pharmaceutical agent.

4. The method of claim 1, wherein the Gram-negative pathogen is *P. aeruginosa* and the first antimicrobial agent is taylorflavin A with a concentration of 25 µg/mL.

5. The method of claim 1, wherein the Gram-negative pathogen is *E. coli* and the first antimicrobial agent is taylorflavin A with a concentration of 37.5 µg/mL.

6. The method of claim 1, wherein the Gram-negative pathogen is *E. coli* and the first antimicrobial agent is cebulantin with a concentration of 9.7±0.4 µM.

7. The method of claim 1, wherein the Gram-negative pathogen is *V. parahaemolyticus* and the first antimicrobial agent is cebulantin with a concentration of 8.8±2.1 µM.

8. The method of claim 1, wherein the Gram-negative pathogen is *V. cholerae* and the first antimicrobial agent is cebulantin with a concentration of 14.1±2.4 µM.

9. The method of claim 1, wherein the Gram-negative pathogen is *V. ordalii* and the first antimicrobial agent is cebulantin with a concentration of 27.0 ±5.4 µM.

10. The method of claim 1, wherein the Gram-negative pathogen is *V. anguillarum* and the first antimicrobial agent is cebulantin with a concentration of 29.1±8.2 µM.

11. The method of claim 1, wherein the Gram-negative pathogen is *P. aeruginosa* and the first antimicrobial agent is cebulantin with a concentration of 47.0±11.4 µM.

* * * * *